United States Patent [19]

Belentepe et al.

[11] 4,359,042
[45] Nov. 16, 1982

[54] CONTOURED INSULATION WINDOW FOR EVACUATED SOLAR COLLECTOR

[75] Inventors: Yilmaz C. Belentepe, Corning; Li-Chung Lee, Horseheads; Arthur H. Wilder, Corning, all of N.Y.

[73] Assignee: Corning Glass Works, Corning, N.Y.

[21] Appl. No.: 156,611

[22] Filed: Jun. 4, 1980

[51] Int. Cl.³ ............................................... F24J 3/02
[52] U.S. Cl. ................................... 126/443; 126/446
[58] Field of Search ................ 126/446, 447, 443; 52/200, 788, 314; 428/34

[56] References Cited

U.S. PATENT DOCUMENTS

| | | | |
|---|---|---|---|
| 4,185,616 | 1/1980 | Johnson | 126/443 |
| 4,186,723 | 2/1980 | Coppola et al. | 126/443 |
| 4,204,521 | 5/1980 | Mattson | 126/446 |
| 4,210,128 | 7/1980 | Mattson | 126/444 |

Primary Examiner—Carroll B. Dority, Jr.
Attorney, Agent, or Firm—John P. DeLuca

[57] ABSTRACT

An insulating contoured solar window is provided for use with an enclosed chamber or structure such as an evacuated flat plate solar collector. The solar window is supported about its peripheral portion and in order to withstand the pressures exerted thereon by atmosphere the window may be outwardly domed along its longitudinal and/or transverse extent. Intermediate portions between domes are supported by a lower portion of the structure. A perforated or segmented absorber may be located in the chamber and spaced from the peripheral and intermediate portions in order to prevent heat loss from the absorber to the structure through the window. A pair of such solar windows may be arranged with corresponding peripheral and intermediate supports in opposed supporting contact.

8 Claims, 7 Drawing Figures

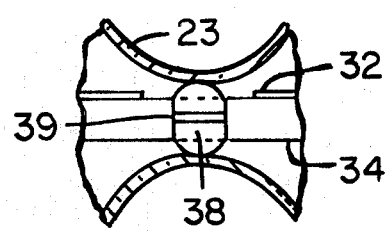
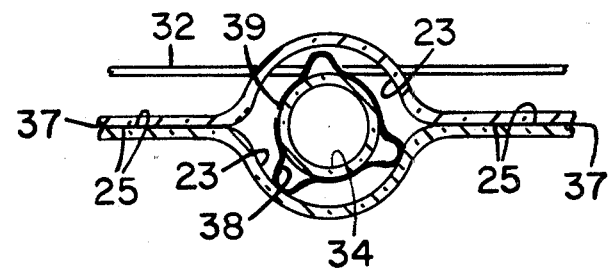
Fig. 6          Fig. 7
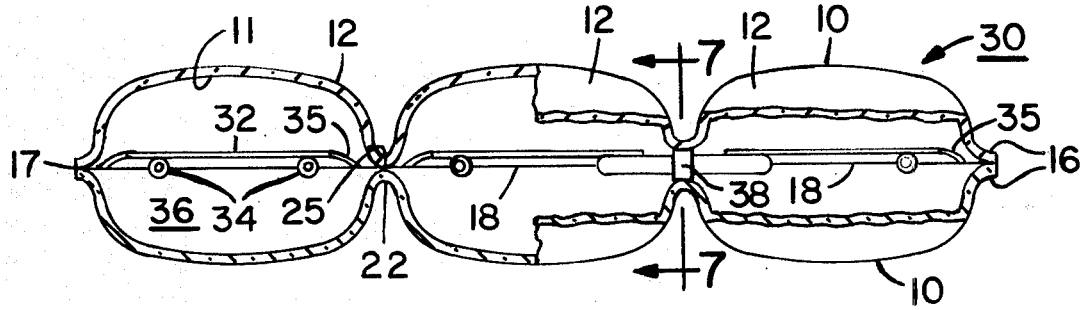
Fig. 5
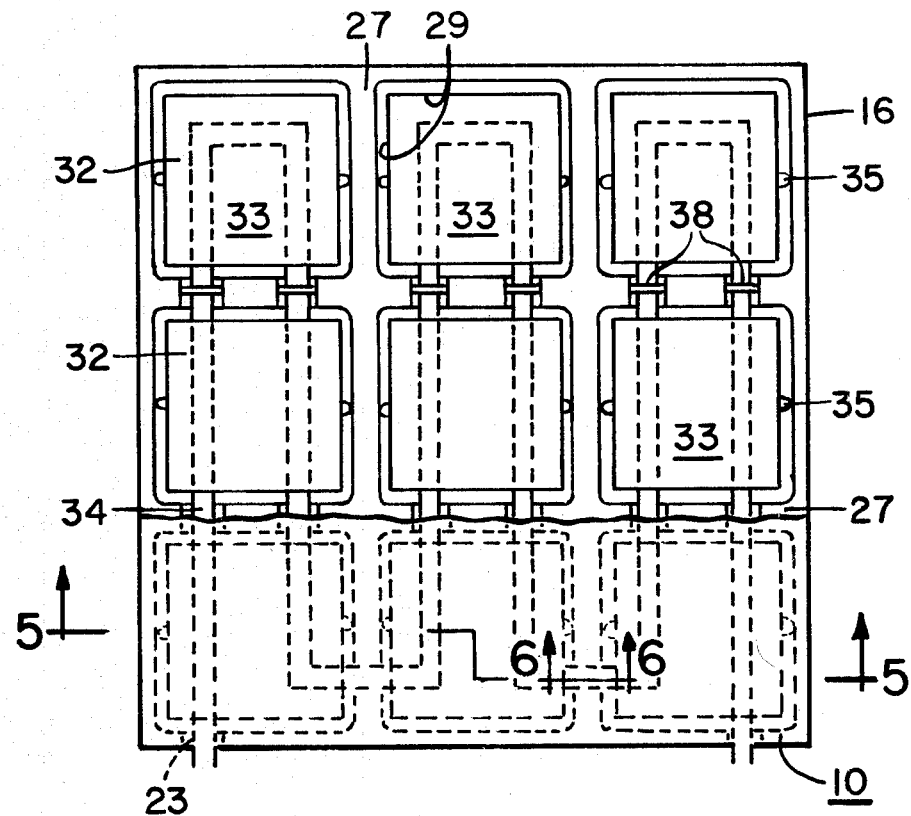
Fig. 4

CONTOURED INSULATION WINDOW FOR EVACUATED SOLAR COLLECTOR

BACKGROUND OF THE INVENTION

The efficiency of solar heat collectors is affected by the amount of convection, conduction and radiation losses associated with their construction. It has been found that heat losses due to convection and conduction may be materially reduced by evacuating the air space within the solar collector about the absorber or collector plate. However, in the case of standard flat plate solar heat collectors having standard sized flat plate absorbers, it has not been possible to evacuate such collectors and provide a single solar window over the same which is supported solely about edge portions thereof, due to the atmospheric load which is exerted thereon upon evacuation of the collector. That is, with a standard atmospheric pressure of about 15 lbs./sq. in., an evacuated relatively shallow solar collector structure will have an atmospheric pressure of approximately one ton per square foot on the collector window.

Realizing that it was impossible to subject the standard flat window of a flat plate heat collector to such forces without catastrophic failure, the prior art devices such as shown in U.S. Pat. No. 3,929,122 and No. 3,974,823 utilized two solar windows spaced apart from one another to form a dead air space between the ambient atmosphere and the interior of the solar collector containing the absorber plate. Although the dead air space provided a degree of insulation, convection and conduction heat losses of significant magnitude were still experienced.

In order to provide the desired vacuum within the solar collector so as to minimize convection and conduction heat losses from the absorber plate through the collector window to the ambient atmosphere, tubular solar collectors were utilized as shown in U.S. Pat. No. 3,227,153. The use of the tubular construction, which is strong in compression, permitted the evacuation of the solar collector and thereby materially reduced heat losses due to convection and conduction. However, the diameter of the solar collector was of course limited to practical aspects which accordingly limited the area of the flat plate collector or absorber member retained therein. Thus, in order to obtain the same surface area as was obtainable with a standard flat plate collector of a relatively large shallow structure, it was necessary to provide a multiplicity of such tubular collectors.

Other attempts have been made in supporting expansive flat solar windows in evacuated flat plate collectors, such as utilizing support posts as shown in U.S. Pat. No. 3,995,615 and longitudinally extending partition walls as shown in U.S. Pat. No. 4,038,965. Although the support posts of the former patent permit utilization of a standard flat plate collector, each of the support posts in fact reduces the effective area of the collector and may impart unsafe stress to the flat window at each contact point. In the case of the latter patent, the plurality of longitudinal partitions necessitate the utilization of a plurality of small collector plates similar to that used in the evacuated tubular collector, and again such partitions may interfere with optical efficiency and function as conductors or heat sinks to the solar window with the resultant loss of efficiency.

U.S. Pat. No. 3,986,491 discloses the use of a sheet of transparent or translucent corrugated plastic positioned above and across a metallic heat collecting surface having hills and valleys, with the corrugation as far as possible focusing the rays of the sun on one side of the flaring hills in the morning and focusing the solar rays on the opposite side of the hills during the afternoon. However, the solar collector is not evacuated, as an air space is provided within the collector between the transparent or translucent plastic solar window and the metallic collector plate.

U.S. Pat. Nos. 4,186,723 and 4,184,480, the teachings of which are incorporated herein by reference, disclose in various embodiments evacuated insulating contoured windows which are supported solely about a peripheral seal edge for the structure. A plurality of laterally extending support beams project arcuately outwardly from the support edge and are joined along adjacent portions to form a plurality of sinusoidal corrugations. In the former a solar panel within the window is in contact with only a limited portion of the seal edge and thus conduction losses are minimized. While the above structure may be constructed having any length desired, the lateral dimension is limited to practical size by the contour of the beams.

Accordingly, the present invention has overcome the problems of prior art devices by providing a perforated or segmented evacuated flat plate collector within a substantially continuous solar window which is supported about peripheral portions and intermediate portions within the perforations which withstand the atmospheric forces exerted thereon.

SUMMARY OF THE INVENTION

In its simplest form, the present invention is directed to a contoured insulating structure or cover for an enclosed chamber and an evacuated perforated flat plate collector utilizing such structure in the form of a solar window. The solar window is supported about its peripheral portions, and in order to withstand the pressures exerted thereon by the atmosphere, the window may be domed along its longitudinal and/or transverse extent. In order to form one or more beams which will withstand the atmospheric pressure with a minimum of glass deformation, the upwardly extending domes are each contoured in the form of a paraboloid, a spheroid or ellipsoid. The beams are joined along adjacent portions to form a plurality of intermediate corrugated support means, the junctures of which lie in a plane freely resting on a lower portion of the structure in the perforations. Thus, it is possible to form a continuous window for an evacuated flat plate collector which is of a minimum thickness and weight, but yet will withstand the forces of atmospheric pressure being exerted thereon.

The problem of producing a continuous solar window for an evacuated solar collector not only resides in the production of such a window which will not fail when subjected to atmospheric pressure, but in forming such a window with a minimal thickness so as to minimize the weight of the collector and facilitate transmission through the window. Since many solar collectors are mounted upon roof portions of residential or commercial buildings, it is necessary from a pure structural and economic standpoint to limit the amount of weight incorporated within the solar collector, and thus minimal solar window thickness is desired. Further, transmission is certainly enhanced and refraction reduced by utilizing minimal thickness solar windows. In the U.S.

Pat. No. 4,186,723 such considerations are discussed and are incorporated herein by reference. Since it is intended to provide intermediate support means in the present invention it may be possible to yet further reduce the glass thickness. However, for purposes of the disclosure the minimum thickness allowable therein would be workable herein.

BRIEF DESCRIPTION OF THE DRAWINGS

FIG. 4 is a top view of an evacuated flat plate solar collector with a portion of the top window removed.

FIG. 5 is an offset lateral cross section in elevation of the collector of FIG. 4 along line 5—5 thereof.

FIG. 6 is an enlarged fragmented lateral cross section of a pipe contour taken along line 6—6 of FIG. 4.

FIG. 7 is an enlarged fragmented axial cross section of a pipe contour taken along line 7—7 of FIG. 5.

DESCRIPTION OF THE PREFERRED EMBODIMENTS

Figure 1:
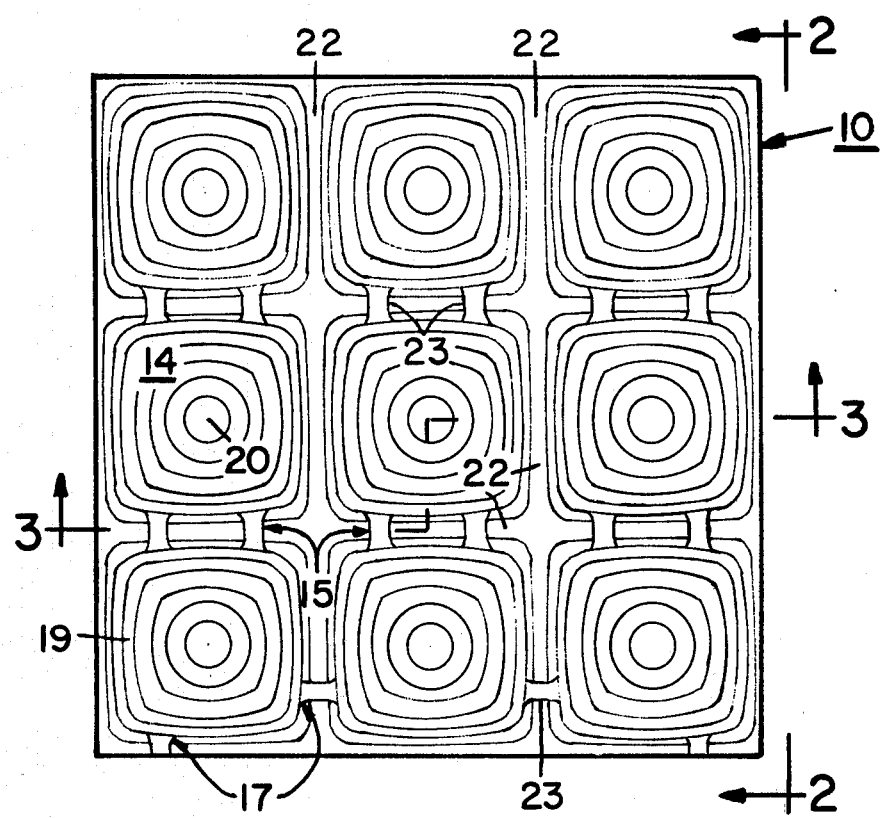
FIG. 1 is a somewhat schematic contour line drawing of the top plan view of a solar window embodying the present invention.
Figure 2:
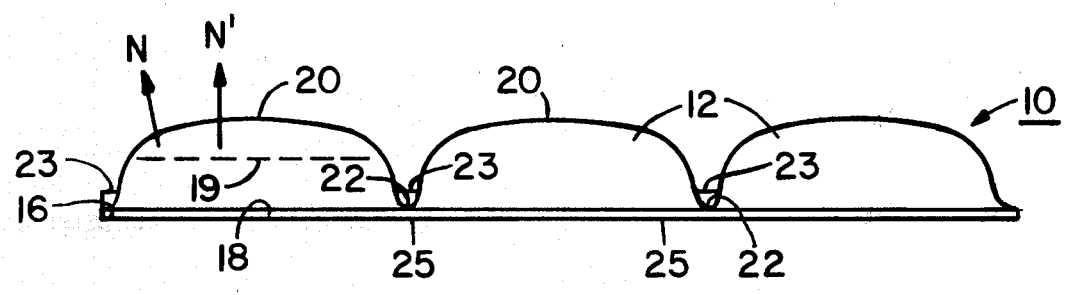
FIG. 2 is a longitudinal elevational view of the window taken along line 2—2 of FIG. 1.
Figure 3:
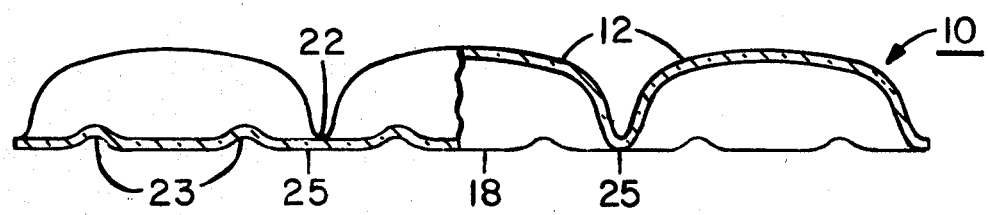
FIG. 3 is an offset lateral cross sectional view in elevation taken along line 3—3 of FIG. 1.

Referring now to the drawings, and particularly FIGS. 1–3, a contoured solar window 10 is disclosed having a 3×3 array of domed members or domes 12 each extending longitudinally and transversely thereof. Each dome 12 may be in the form of or take the shape of a paraboloid, spheroid or ellipsoid 14. The window 10 is bounded by a peripheral sealing edge or flange portion 16 which lies within a plane 18. The domes 12 terminate at their upper extent in peaks 20 and at their lower extent in valleys 22. Pipe contours 23 are located at spaced intervals in the valleys 22 to accommodate a fluid carrying member later described.

It should be appreciated from FIG. 1 that, although any arrangement may be possible, the solar window 10 shown is a 3×3 array of domes 12. Pipe contours 23 are located depending on the path defined for the passage of working fluid through the solar collector hereinafter described, and thus, may be in traverse or lateral directions through the respective valleys.

The underside of valleys 22 lie in the plane 18, and form intermediate supports 25 resting on lower portions of a solar collector housing (hereinafter described). It is intended that the intermediate supports 25 will be in contact only with non-heat conducting members to reduce conduction losses.

It should be appreciated that the shape of the domes 12 illustrated is important since shape reversals (i.e. going from convex to concave) are to be avoided if possible and, where incorporated by necessity, should be carefully designed. In FIG. 1 for example contour lines 19 of domes 12 are shown as continually curving lines in projection. This illustrates a principle of the present invention that each dome 12 curves outwardly in all directions. As much as possible any number of normals N—N' to contour lines 19 are not parallel. It should be understood that there may be for certain parts of the window 10 parallel normals N (e.g. for cylindrical pipe contours 23), but the nonparallel normals are predominant by design. Surface reversals from convex to concave are bound to occur as is evident from the design of the window 10. For example domes 12 and pipe contours 23 are convex. But transitions from one dome to the next (valleys 22) are concave. Similarly, transitions from dome 22 to pipe contours 23 (arrow 17) are concave, as are the transitions from pipe contours 23 to intermediate supports 25 (arrow 15). These transitions may be designed so that the resulting stresses are minimized. Incorporation of the intermediate supports 25, as in the case of the valleys 22, reduces stress by virtue of added support. The inherently strong cylindrical shape of pipe contours 23 reduces stress and, where reversals are required, the total area subject to stress is minimized by designing the reversals with gradual but relatively short radii.

Referring now to FIGS. 4 and 5 an evacuated flat plate solar collector 30 is shown having a housing including a pair of upper and lower portions in the form of contoured solar windows 10 of the present invention sealed together along a juncture 17 of opposed peripheral seal edges 16. Various sealing modes may be utilized as desired, for example, frit and fusion seals. A perforated or segmented collector plate or absorber 32 having at least one fluid channel 34 secured to an under surface thereof is shown positioned within a partially evacuated chamber 36 formed between said solar windows 10. In all cases, the contoured solar windows 10 are partially supported against atmospheric pressure about their peripheral sealing edge or support flange portions 16. Since it is preferable to insulate the collector plate 32 from the solar windows 10, the collector plate 32 is suitably spaced therefrom.

The spaced domes 12 may be contoured in the shape of paraboloids, spheroids or ellipsoids which provide a plurality of structures extending all or part way transversely across the window 10. In the 3×3 arrangement shown in FIG. 1, each dome 12 extends part way across the window 10 and forms a collapse resistant structure. In a 1×3 arrangement each dome would fully extend across the window in one direction but part way in the other.

To form a solar window of minimum thickness strengthened glass material may be used which can withstand the atmospheric forces exerted on the exterior thereof due to the evacuated chamber 36 formed interiorally thereof. The shaped cross section of each dome 12 in FIG. 4 is sufficiently arcuate, so that the plurality of domes 12 joined together along adjacent base portions or valleys 22, maximize the overall strength with a given minimum thickness of strengthened glass, and with a minimum amount of deformation of the strengthened glass.

It is preferred to produce the contoured solar window of the present invention from a glass having a relatively high tensile strength and a modulus of rupture (MOR) about three times the anticipated maximum stress. For the structure shown it is anticipated that the maximum stress the window will see is about 5000 psi, thus the designed minimum MOR is about 15,000 psi. As previously pointed out in U.S. Pat. No. 4,186,723, a laminated or chemically strengthened glass permits the utilization of much thinner and accordingly much lighter glass sheet due to the higher MOR. The laminated glasses utilized may be formed in accordance with the disclosure set forth in U.S. Pat. No. 3,673,049, whereas the chemically strengthened glasses may be obtained through utilization of the disclosure set forth in U.S. Pat. No. 3,790,430, the teachings of the latter two patents also incorporated herein by reference as necessary. Although other glasses may be utilized, the required increase in glass thickness and accordingly overall weight detract from both the optics and economy of utilizing such other glasses. Further, the lower window portion shown in FIG. 5 may be replaced with a suitably strengthened and insulated housing, since the solar collective aspects of the lower window are unimportant; however, we prefer the utilization of the double window structure shown in FIGS. 4 and 5 due to the high strength to weight ratio obtained through utilization thereof.

Various absorbing coatings may be applied to the absorber 32 and reflective coatings to the inner surface 11 of the windows 10 as is known in the art to enhance the collection of solar energy.

The collector plate 32 may be separated into a plurality of individual flat plates 33 each supported in part by fluid tubes 34 connected to the underside. If desired, support may be provided peripherally by edge clips 35. The collector plate 32 is out of contact with the intermediate supports 25 in plane 18, thus avoiding conduction loss to the window 10. Each flat plate 33 is sized so that its peripheral edges 29 come as close as possible to the glass near the valleys 22 without contacting, thereby maximizing the collector area. Although the individual arrangement of flat plates 33 is preferred for this embodiment, it is possible if desired to have a single collector plate 32 having perforations to accommodate the intermediate supports 25.

Intermediate supports 25 of the one window 10 rest freely against the same portion of the other window 10. An inorganic material such as glass fiber (see heavy line 37 in FIG. 7) may be located between intermediate supports 25 to act as a cushion and prevent abrasion therebetween.

Pipe support clips 38 are fitted about the fluid carrying members or pipes 34 to space them away from contact with the glass of the windows 10 as the pipes 34 pass through the pipe contours 23 from one dome 12 to another. Clips 38 are split at 39 to facilitate assembly and allow for expansion.

In another embodiment of the present invention a pair of solar windows 10, arranged as set forth in FIGS. 4 and 5, may be utilized without the collector plates 32 and fluid carrying member 34 and without the provision for pipe contours 23 and glass fiber cushion 37. The pair of windows 10 thus act as an evacuated transparent window or solar skylight. Such an arrangement is advantageous for passive solar applications. In addition to the foregoing, the apparatus of the present invention may be utilized as a substitute for roof or wall structure components in a building or dwelling, thereby reducing the ultimate cost of materials and fabrication. The present invention is simple in construction and component parts. Thus the cost per square foot of collector or unit of energy collected is thereby made more attractive for widespread use.

Although the preferred embodiments of the invention have been set forth, it will be apparent to those skilled in the art that various changes and modifications may be made thereto without departing from the spirit and scope of the invention as defined in the appended claims.

We claim:

1. An evacuated flat plate solar collector comprising, means forming a housing including a pair of opposed glass windows each having a longitudinal and lateral expanse bounded by a peripheral margin and fused together thereabout defining a partially evacuated chamber therebetween, a solar energy absorber segmented into a selected number of plates, said absorber being positioned within said chamber between said windows, fluid channel means joined to said absorber for removing heat therefrom, said fluid channel means passing into and out of said housing, said glass windows each having portions smoothly contoured to provide sufficient strength to withstand the force of atmospheric pressure exerted on one side thereof, the sealed together peripheral margins of the windows forming a peripheral support for the housing and lying within a plane, the contoured portions of each window being formed into a plurality of arcuate domes corresponding in number to the number of plates and being spaced across said window, one plate each being located within a dome, said domes projecting arcuately outwardly from said plane and being joined along adjacent portions thereof to form a plurality of intermediate supports extending across said window longitudinally and laterally of the domes and the plates, junctures of adjacent ones of said domes in one of the windows lying in the plane and freely resting against corresponding portions of the other window thereby providing intermediate mutual support for each window, and said plurality of domes being spaced apart from and out of contact with said plates so as to inhibit conductive heat losses from the solar collector.

2. The solar collector of claim 1 wherein said solar glass window includes fluid channel contours traversing the intermediate supports sized for accommodating in spaced relation the fluid channel means, the latter communicating from one dome to another.

3. The solar collector of claim 2 including clip support means located in said fluid channel contours for spacing the fluid channel means away from the glass.

4. The solar collector of claim 1 wherein said plurality of domes are in the form of at least one of a paraboloid, spheroid and ellipsoid positioned at least longitudinally and transversely of the solar window between the peripheral and intermediate supports so as to impart sufficient strength to such window so as to withstand the forces exerted on the surface thereof by atmospheric pressure.

5. The solar collector of claim 1 wherein said contoured solar window is formed from a strengthened glass having a minimum MOR of 15,000 psi and a thickness sufficient to withstand the forces exerted on one surface thereof by atmospheric pressure.

6. The solar collector of claim 1 further including an inorganic cushion disposed between the opposed intermediate supports.

7. The solar collector of claim 1 wherein a substantial portion of the contour of each dome comprises a convex surface and normals to said surface are nonparallel.

8. An evacuated flat plate solar window comprising, means forming a housing including a pair of opposed glass windows each having a longitudinal and lateral expanse bounded by a peripheral margin and fused together thereabout defining a partially evacuated chamber therebetween, each window including portions contoured to provide sufficient strength to withstand the force of atmospheric pressure exerted on one side thereof, the sealed together peripheral margins of the windows forming a peripheral support for the housing lying within a plane, the contoured portions of each window being formed into a plurality of arcuate domes spaced across said window, said domes projecting arcuately outwardly from said plane and being joined along adjacent portions thereof to form a plurality of intermediate supports extending across said solar window, junctures of adjacent ones of said domes of one window lying in the plane and freely resting against corresponding portions of the other window thereby providing intermediate mutual support for each window, and said plurality of domes of one window, except where communicating with and projecting outwardly from said peripheral support and the intermediate supports, being spaced apart from and out of contact with the remainder of said window so as to inhibit conductive heat losses through the solar window, solar collector means located in each dome and spaced from the glass forming the domes.

* * * * *